United States Patent [19]

Mödinger et al.

[11] Patent Number: 5,332,263
[45] Date of Patent: Jul. 26, 1994

[54] ACTUATING MEANS FOR A BUCKLE IN A SAFETY BELT SYSTEM

[75] Inventors: Thomas Mödinger, Vordersteinenberg; Ulrich Gölz, Schechingen, both of Fed. Rep. of Germany

[73] Assignee: TRW Repa GmbH, Alfdorf, Fed. Rep. of Germany

[21] Appl. No.: 81,515

[22] Filed: Jun. 23, 1993

Related U.S. Application Data

[62] Division of Ser. No. 823,900, Jan. 22, 1992, Pat. No. 5,275,437.

[30] Foreign Application Priority Data

Feb. 20, 1991 [DE] Fed. Rep. of Germany ... 9102006[U]

[51] Int. Cl.⁵ .............................................. B60R 22/46
[52] U.S. Cl. ..................................... 280/806; 297/480
[58] Field of Search ................ 280/801 R, 803, 805, 280/806; 297/468, 470, 480; 24/633, 640, 642

[56] References Cited

U.S. PATENT DOCUMENTS 5,211,447  5/1993  Sedlmayr et al. ................ 297/468

FOREIGN PATENT DOCUMENTS 3341568  5/1985  Fed. Rep. of Germany .
3936306  5/1991  Fed. Rep. of Germany .
4006020  8/1991  Fed. Rep. of Germany .
2238077  5/1991  United Kingdom .

*Primary Examiner*—Margaret A. Focarino
*Assistant Examiner*—Paul N. Dickson
*Attorney, Agent, or Firm*—Tarolli, Sundheim & Covell

[57] ABSTRACT

An actuator for a buckle in a vehicle safety belt system is disclosed. A belt tightener engages on the buckle. In operation, the belt tightener moves the buckle towards the vehicle floor to tighten the webbing. An actuating member is arranged at a stationary location so that relative movement occurs between the buckle and the actuating member when the former is moved towards the vehicle bottom. A force transmitting connection permitting such relative movement is provided between the buckle and the actuating member. This connection can be embodied by a flexible cable or by a rack bar and a tooth member cooperating therewith.

5 Claims, 6 Drawing Sheets

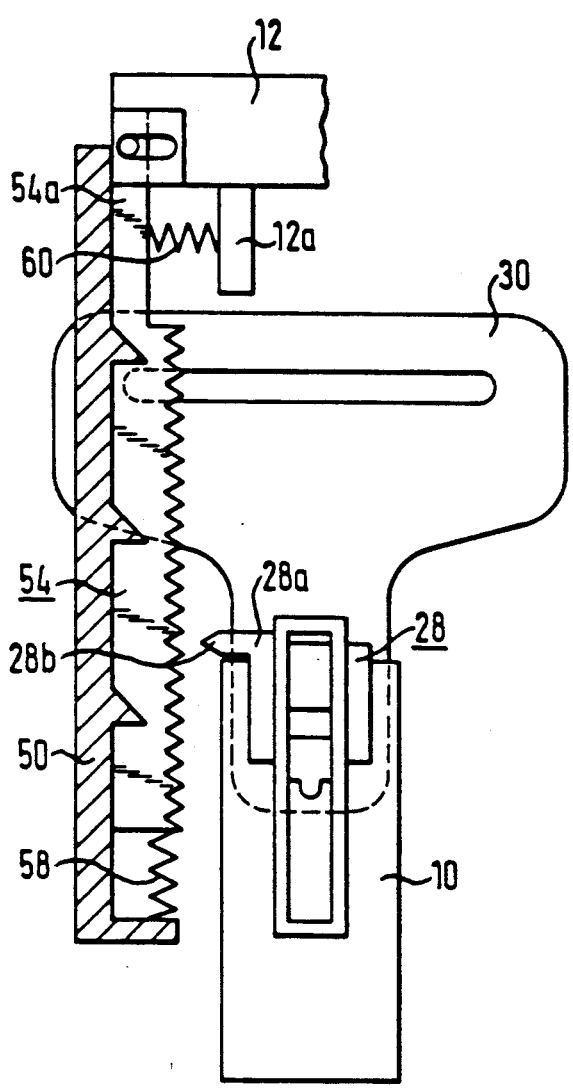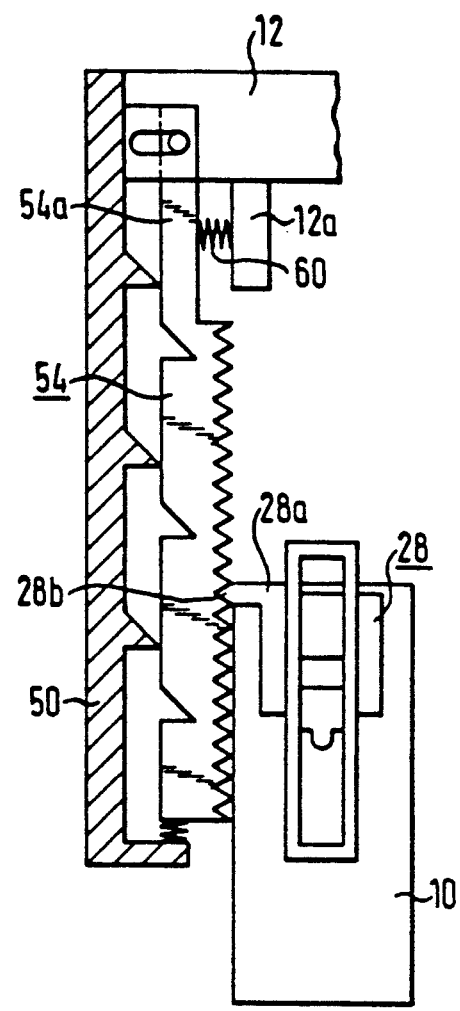

ACTUATING MEANS FOR A BUCKLE IN A SAFETY BELT SYSTEM

This is a divisional of copending application(s) Ser. No. 07/823,900 filed on Jan. 22, 1992, now U. S. Pat. No. 5,275,437.

The invention relates to an actuating means for a buckle in a safety belt system for vehicles provided with a belt tightener which engages the buckle. In operation of a belt tensioner of this kind, the buckle is shifted out of its rest position in the direction towards the vehicle floor to eliminate belt slack. An actuating element engages the release member of the buckle to permit release of a tongue from the buckle.

When in the event of a vehicle collision a belt tightener moves the buckle towards the vehicle floor, the actuating element of the buckle after belt tightening has been effected is disposed in a position differing from the usual position of use. When after a vehicle collision, possible in an emergency situation, the vehicle occupant feels for the actuating element of the buckle, he does not find it in the accustomed position. The freeing of a helpless vehicle occupant from a damaged vehicle after a vehicle collision is also made difficult if the helpers do not find the actuating element of the buckle in a position known beforehand.

Based on these recognitions, the invention provides an actuating means for a buckle in a safety belt system for vehicles in which the actuating element of the buckle assumes the same position unchanged before and after actuation of the belt tightener. This is achieved according to the invention in that the actuating element is arranged at a stationary location in the vehicle and is connected to the release member of the buckle via a force-transmitting connection permitting a relative movement between the buckle and the actuating element.

According to a first proposed solution the force-transmitting connection is formed by a sheathed cable. According to a first embodiment of this proposed solution tile sheathed cable is formed by an inner pulling cable and an outer thrust-resistant sheath, one end of the pulling cable is connected to the release member and the other end of the pulling cable is connected to the actuating element via a movement converting element, for example a lever, converting a thrust movement to a pulling movement. According to a second embodiment of this solution the sheathed cable is formed by a pulling cable which is guided via a deflecting element, held tensioned in a closed loop and to one end of which the release member is connected, tile other end thereof being connected to the housing of the buckle or to a member rigidly connected to the latter so that the portion of the pulling cable connected to the release member on activation of the belt tightener follows tile movement of the release member in the same sense; the actuating element engages a portion of the pulling cable held tensioned between two deflecting elements in the sense of a loop formation between said deflecting elements.

According to a second solution the force-transmitting connection includes a movement converting means which converts the actuating travel of the actuating element to a combined thrust and transverse movement of a transmission element which when the actuating element is not actuated is uncoupled from the release member of the buckle and when the actuating element is actuated is coupled to said release member by the transverse movement of the transmission element.

Further features and advantages of the invention will be apparent from the following description of several embodiments and from the drawings, to which reference is made and in which:

FIGS. 5 to 8 show an embodiment of the actuating means according to a second proposal in different operating positions.

Figure 1:
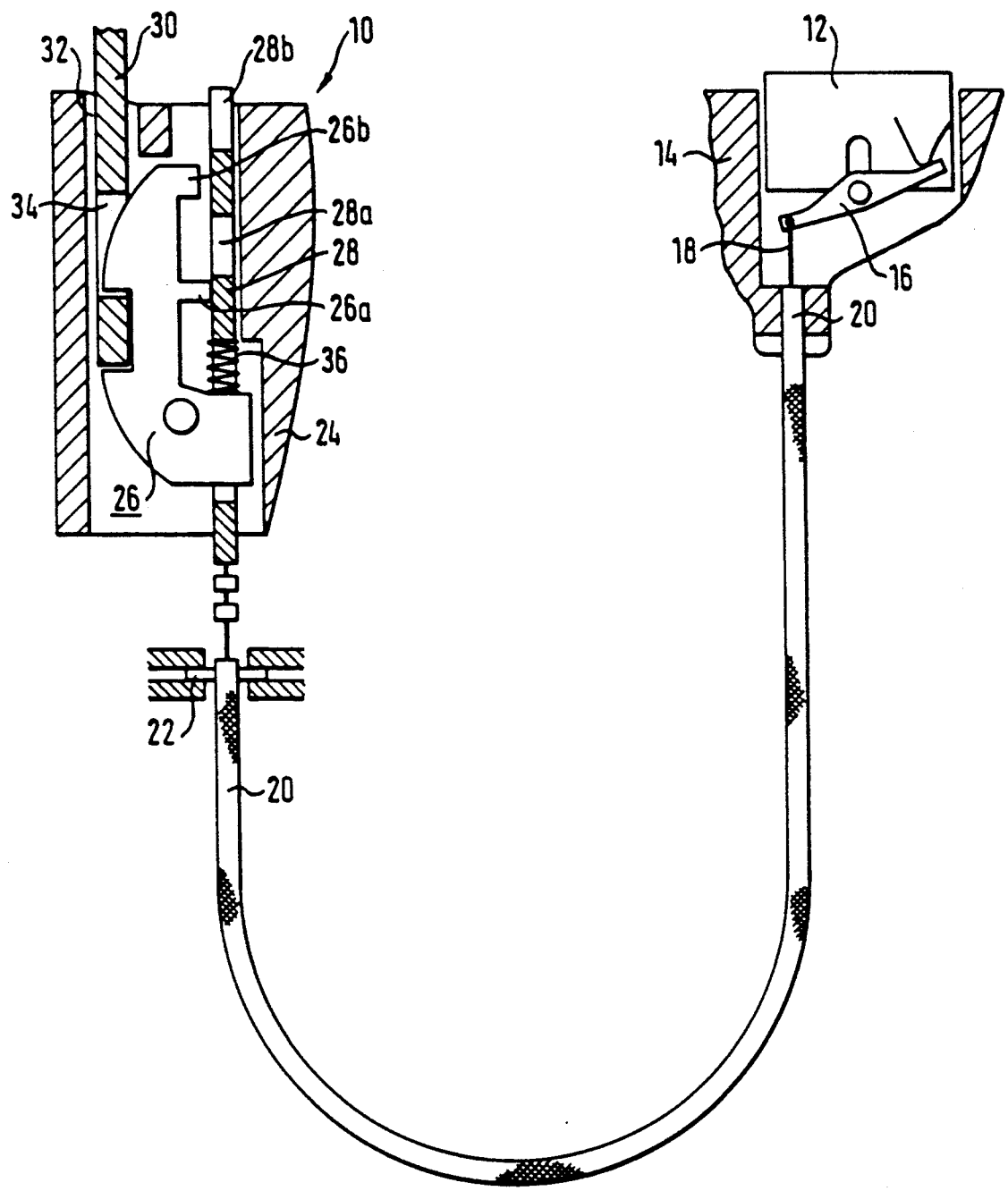
FIG. 1 is a partially sectioned schematic view of an embodiment of the actuating means according to a first proposal.

In the embodiment shown in FIG. 1 a buckle 10 and the actuating element 12 associated therewith are arranged spaced apart adjacent each other at substantially the same height. The buckle 10 is shown in its rest position from which it is moved on actuation of a belt tightener (not illustrated) through a distance of for example 6 to 10 cm in the direction towards the vehicle floor. The actuating element 12 in the form of a push button is displaceably received on a guide member 14 mounted stationarily in the vehicle. Time actuating element 12 presses onto the one end of a pivotally mounted two-armed lever 16, the other end of which engages the inner pulling cable 18 of a sheathed cable, the thrust-resistant outer sheath 20 of which is supported at its one end on the guide member 14 and at its other end at 22 on a member connected to the buckle 10. The end of the sheathed cable adjacent the buckle 10 can therefore follow the movements of the buckle on activation of the belt tightener.

The buckle 10 consists of a housing 24 dimensioned to bear loads, a lock bar 26 pivotally mounted thereon and a release member 28 in the form of a blocking plate mounted longitudinally displaceably in the housing 24. The insert tongue 30 of the webbing system is introduced into an insert opening 32 of the housing 24 and comprises a detent window 34 into which a detent nose of the lock bar 26 engages. The release member 28 is provided with entrance openings 28a, 28b for locking extensions 26a, 26b of the lock bar 26. The release member 28 prevents the detent nose of the lock bar 26 coming free of the detent opening 34 of the insert tongue 30 for as long as the locking extensions 26a, 26b are not able to enter the entrance openings 28a, 28b. The end of the pulling cable 18 adjacent the buckle 10 is connected to the release member 28. On actuation of the push button forming the actuating element 12, via the pulling cable 18 the release member 28 is shifted against the action of a return spring 36 until the locking extensions 26a, 26b can enter the entrance openings 28a, 28b in order to permit pivoting of the lock bar 26 clockwise in FIG. 1 and thus a freeing of the insert tongue 30 from the buckle 10.

In normal use the buckle 10 and the actuating element 12 are adjacent each other a small distance apart so that operation of the buckle is possible in a manner similar to that with a buckle with integrated actuating element. When due to an activation of the belt tightener following a vehicle collision the buckle has been shifted towards the vehicle floor, the actuating element 12 is still in the accustomed position on the guide member 14.

Figure 2:
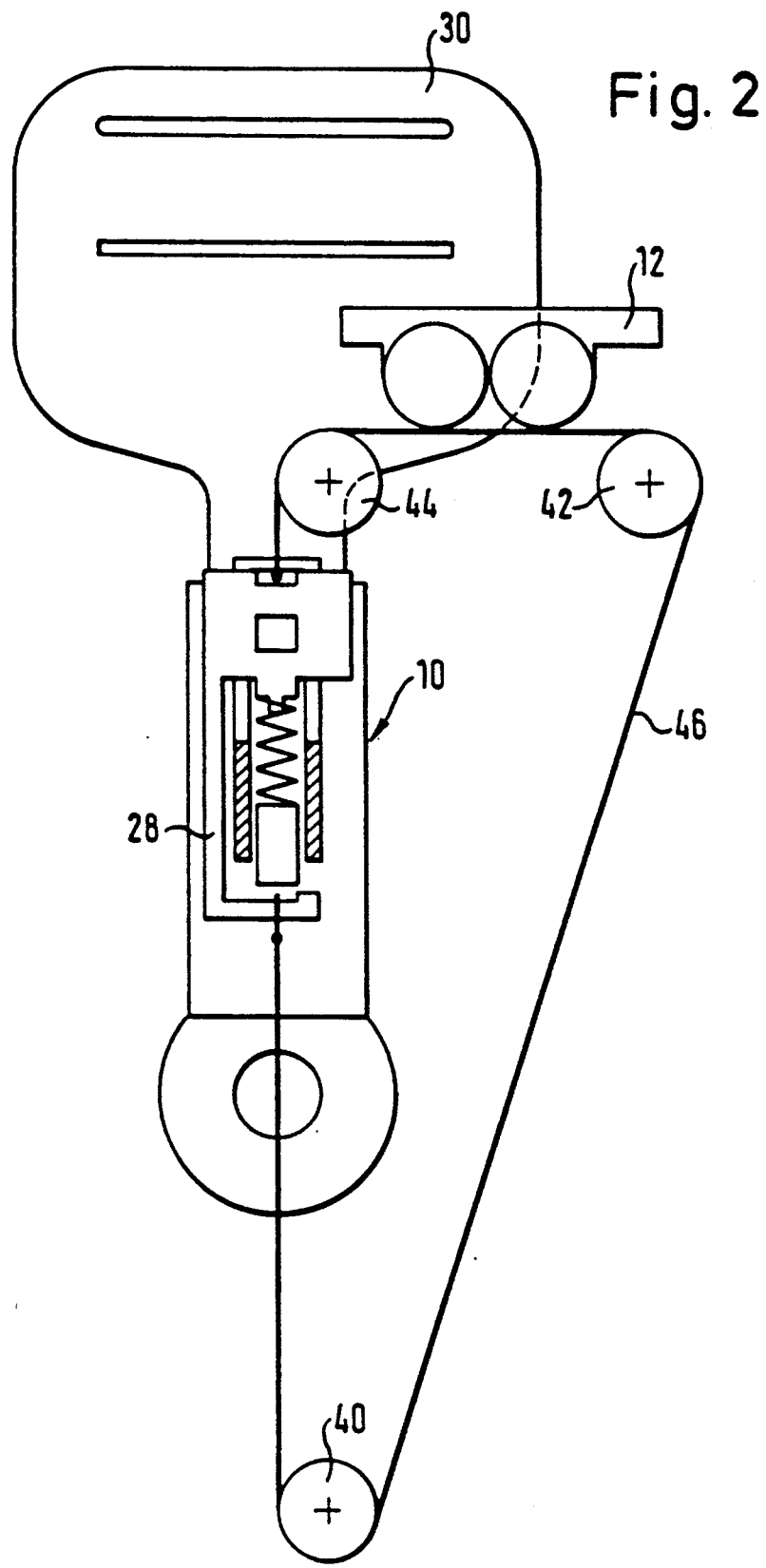
FIGS. 2, 3 and 4 show a second embodiment of the actuating means according to the first proposal in different operating states.
Figure 3:
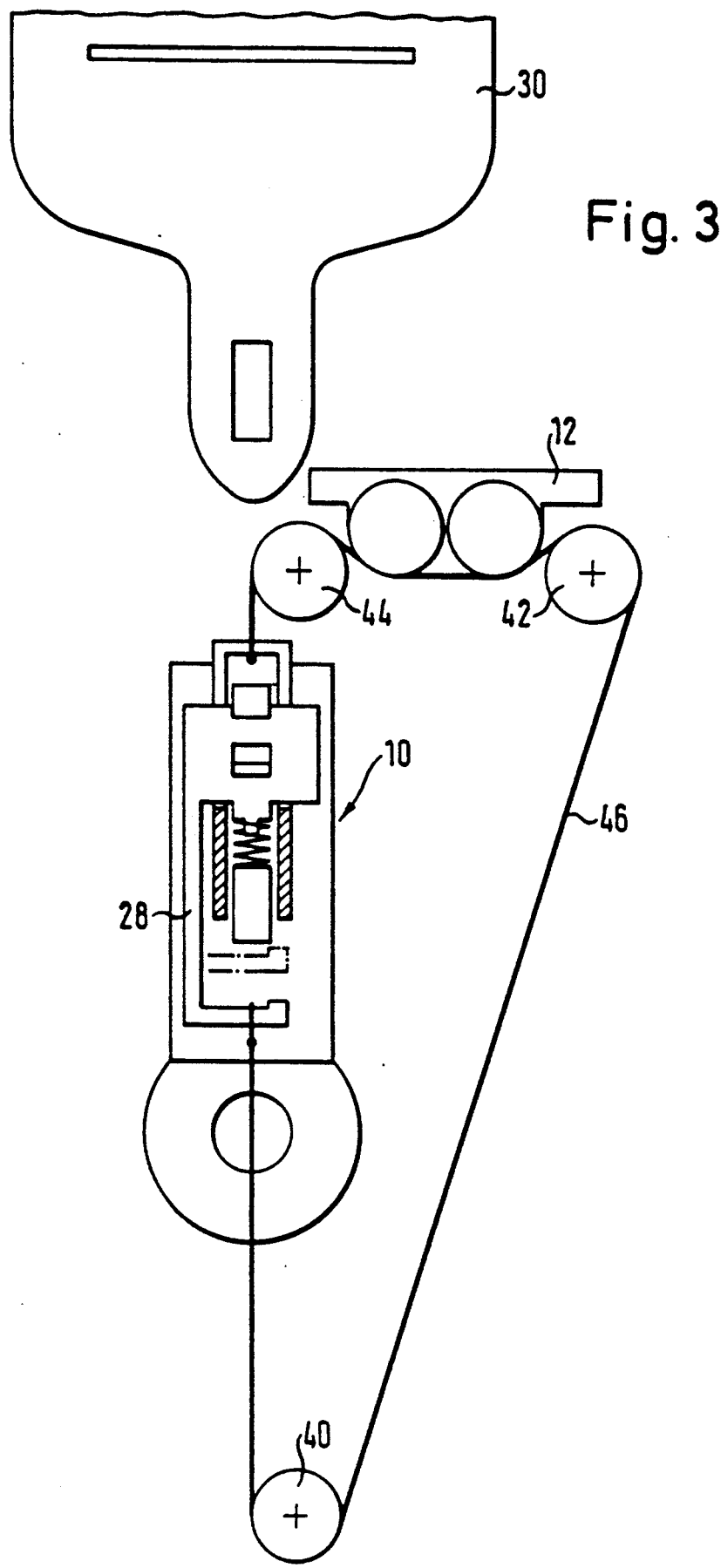

In the embodiment according to FIG. 2 as well the pressure exerted on the actuating element in the form of a push button 12 is transmitted via a sheathed cable to the release member 28 of the buckle 10. In this case however, said sheathed cable is replaced by pulling a cable 46 which is guided over three deflecting pulleys 40, 42, 44 and one end of which is connected to the housing of the buckle 10, the other end of which being connected to the release member 28. The actuating element 12 acts on the cable portion between the deflecting pulleys 42, 44 by forming said portion to a loop. This state is illustrated in FIG. 3. The loop formation when the actuating element 12 is depressed results in the remaining portions of the pulling cable 46 being correspondingly shortened so that a tension is exerted on the release member 28 relatively to the housing of the buckle 10. The opening travel transmitted in this way to the release member 28 frees the insert tongue 30.

Figure 4:
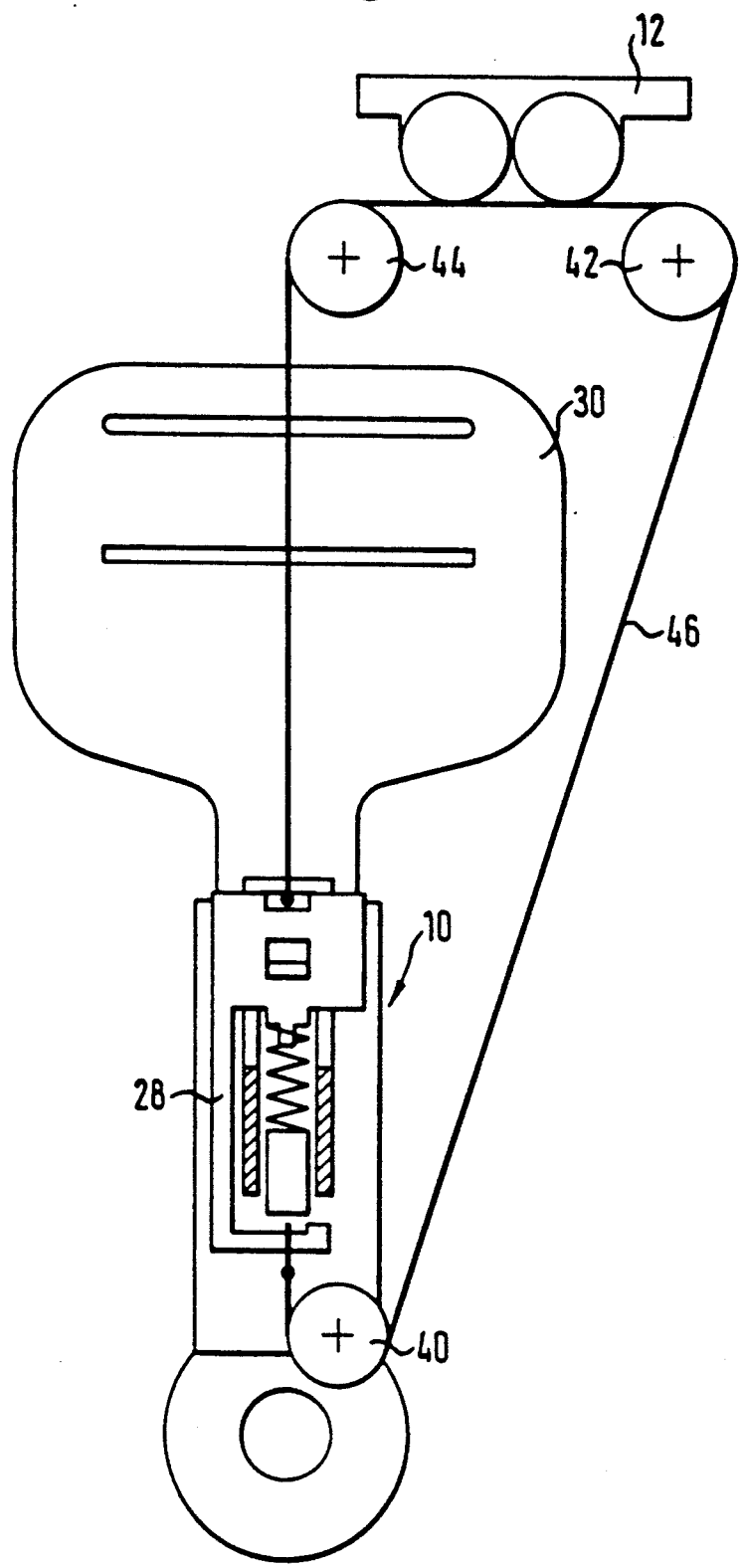
Figure 5:
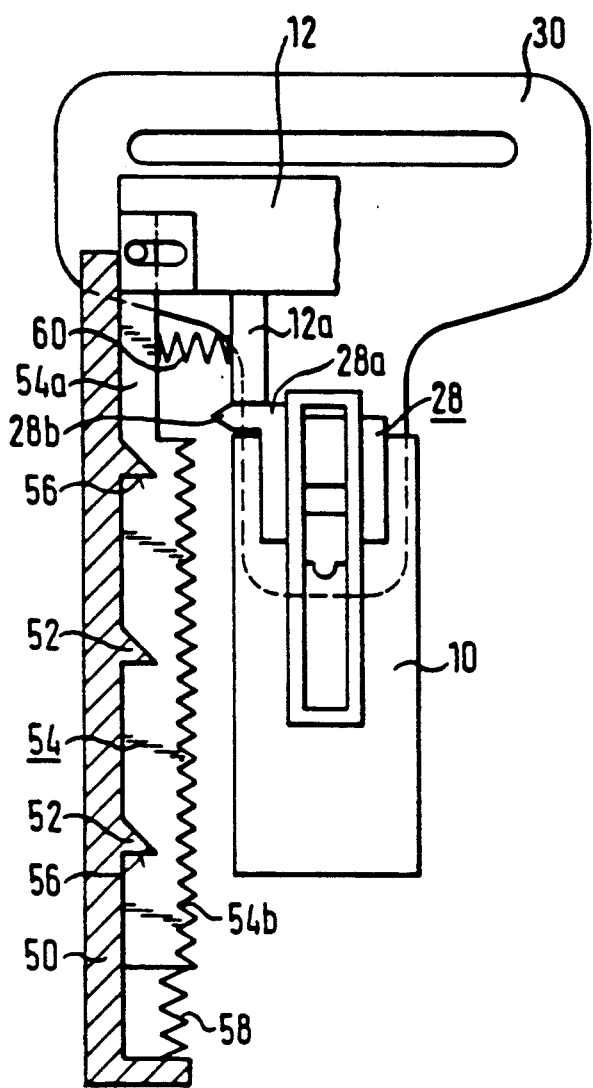

FIGS. 2 and 3 show the lock 10 in its normal rest position; on activation of the belt tightener (not shown) the buckle 10 is shifted in the direction towards the vehicle floor. This state is illustrated in FIG. 4. The pulling cable 46 follows this displacement by rolling on the deflecting pulleys 40, 42 and 44. An actuation of the buckle is still possible by the cable portion held tensioned between the deflecting pulleys 42, 44 being pressed down by the actuating element 12 to form a loop.

Figure 6:
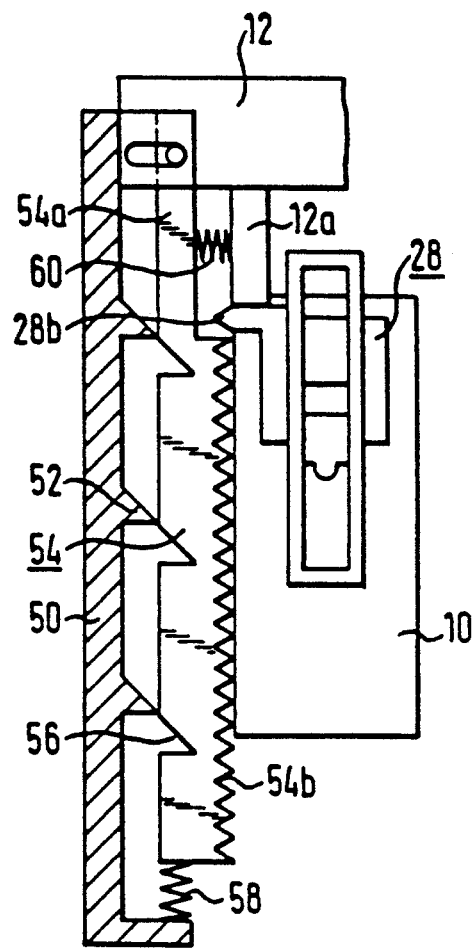

In the embodiment shown in FIGS. 5 to 8 the force-transmitting connection between the actuating element 12, again constructed as push button, and the release member 28 is established via a movement converting means which converts the actuating travel of the actuating element 12 into a combined push and transverse movement. This movement converting means includes a guide rail 50 which is C-shaped in cross-section and fixedly installed in the vehicle parallel to the displacement direction of the buckle 10. Said guide rail 50 is provided at its inner bottom surface with a plurality of ramp elements 52 spaced apart if, the longitudinal direction. A rack bar 54 is guided for longitudinal displacement between the legs of the guide rail 50. Tile rack bar 54 is provided with recesses 56 which are complementary to the ramp elements 52. The rack bar 54 is provided at its end adjacent the actuating element 12 with an actuating arm 54a which is coupled to the actuating element 12 via a pin/slot connection which permits a movement of the rack bar 54 transversely of its longitudinal direction and parallel to the legs of the guide rail 50 but in the longitudinal direction establishes a force-transmitting connection between the actuating element and rack bar 54. The rack bar 54 is biased by a pressure spring 58 in the direction towards the actuating element 12 and at the same time via a pressure spring 60 against the bottom of the guide rail 50. On its longitudinal side facing the release member 28 the rack bar 54 comprises a toothing 54b. The release member 28 is provided with a lateral engagement arm 28a which is directed towards the rack bar 54 and the free end of which terminates in a coupling tooth 28b. This coupling tooth 28b is adapted for engagement between two teeth of the toothing 54b of the rack bar 54. However, in the rest position of the buckle 10 shown in FIGS. 5 and 6 the coupling tooth 28b is disposed opposite the actuating arm 54a and therefore cannot come into engagement with the toothing 54b. The actuating element 12 is provided with a pressure extension 12a which comes into engagement with the engagement arm 28a of the release member 28 as soon as the push button forming the actuating element 12 is depressed. Thus, for as long as the buckle 10 is in its rest position actuation of the release member 28 is effected directly via the actuating element 12. FIG. 6 shows the state with the actuating element 12 depressed. When on the other hand activation of the belt tightener (not shown) has shifted the buckle 10 in the direction towards the vehicle bottom as shown in FIGS. 7 and 8, the pressure extension 12a of the actuating element 12 is spaced from the engagement 28a of the release member 28. The coupling tooth 28b however lies opposite the toothing 54b of the rack bar 54. On depression of the actuating element 12 the rack bar 54 is also depressed via the actuating arm 54a. However, at the same time the ramp elements 52 repel the rack bar 54 in the transverse direction so that the rack bar 54 executes a combined longitudinal and transverse movement and comes into engagement with the coupling tooth 28b. On further depression of the actuating element 12 the release member 28 is entrained and the buckle is opened. This state is shown in FIG. 8.

We claim:

1. An assembly for use in a vehicle safety belt system, said assembly comprising:

buckle for receiving a tongue to which belt webbing is connectable, said buckle being movable away from a rest position in a direction towards the vehicle floor to eliminate slack in the belt webbing;

a movable release member associated with said buckle and for, when moved, allowing the tongue to be released from said buckle;

actuating means for moving said release member said actuating means including an actuatable element and a force-transmitting connection which connects said actuatable element to said release member and which permits a relative movement between said buckle and said actuating element;

a plurality of deflecting elements;

said force-transmitting connection comprising a cable formed by a pulling cable which is guided via said deflecting elements and held tensioned in a closed loop;

said pulling cable having one end thereof connected to said release member and the other end thereof connected to said buckle so that said one end connected to said release member follows movement of said release member upon movement of said buckle from said rest position towards the vehicle floor.

2. An assembly according to claim 1, wherein said actuatable element, when actuated, engages a portion of said pulling cable held tensioned between two deflecting elements in a manner to form a loop between said two deflecting elements and to thereby move said release member to release the tongue from said buckle.

3. A safety belt system comprising:

a buckle for engaging a tongue secured to a safety belt which extends across a vehicle occupant to restrain the vehicle occupant, said buckle having a release member movable between a retain position and a release position, said release member having an engagement portion, in said retain position said release member preventing disengagement of the tongue from said buckle, in said release position said release member permitting disengagement of the tongue from said buckle, said buckle being movable along a pretensioning stroke by a pretensioner;

a plurality of deflector elements; and an actuating means for moving said release member from said retain position to said release position, said actuating means remaining stationary during movement of said buckle along the pretensioning stroke, said actuating means including:

an actuatable element movable by a vehicle occupant;

a force-transmitting connection comprising a cable formed by a pulling cable which is guided via said deflecting elements and held tensioned in a closed loop;

said pulling cable having one end thereof connected to said release member and the other end thereof connected to said buckle so that said one end connected to said release member follows movement of said release member upon movement of said buckle along its pretensioning stroke.

4. A safety belt system according to claim 3, wherein said actuatable element, when actuated, engages a portion of said pulling cable held tensioned between two deflecting elements in a manner to form a loop between said two deflecting elements and to thereby move said release member to said release position to permit disengagement of the tongue from said buckle.

5. An assembly for use in a vehicle safety belt system, said assembly comprising:

a buckle for receiving a tongue to which belt webbing is connectable, said buckle being movable away from a rest position in a direction toward the vehicle floor to eliminate slack in the belt webbing;

a movable release member associated with said buckle and for, when moved, allowing the tongue to be released from said buckle;

actuating means for moving said release member, said actuating means including an actuatable element and a force-transmitting connection which connects said actuatable element to said release member and which permits a relative movement between said buckle and said actuating element;

a plurality of deflecting elements;

said force-transmitting connection comprising a cable formed by a pulling cable which is guided via said deflecting elements and held tensioned in a closed loop;

said pulling cable having one end thereof connected to said release member and the other end thereof connected to a member rigidly connected to said buckle so that said one end connected to said release member follows movement of said release member upon movement of said buckle from said rest position towards the vehicle floor.

* * * * *